United States Patent [19]
Ohto

[11] 3,777,567
[45] Dec. 11, 1973

[54] TEMPERATURE MEASURING APPARATUS FOR ROTATING ROLLERS

[75] Inventor: Kunio Ohto, Matsuyama, Japan

[73] Assignee: Teijin Limited, Osaka, Japan

[22] Filed: Nov. 21, 1972

[21] Appl. No.: 308,305

[30] Foreign Application Priority Data
April 22, 1970 Japan.......................45/39271

Related U.S. Application Data

[63] Continuation-in-part of Ser. No. 135,223, April 19, 1971, abandoned.

[52] U.S. Cl. ............................................... 73/351
[51] Int. Cl. ............................................. G01k 1/08
[58] Field of Search................. 73/343 R, 344, 351, 73/359, 345

[56] References Cited
UNITED STATES PATENTS
3,653,263    4/1972    Poole et al............................ 73/351

Primary Examiner—Donald O. Woodiel
Attorney—Leonard W. Sherman et al.

[57] ABSTRACT

Apparatus for measuring the temperature of a rotating roller mounted on a frame including a temperature sensor mounted on and electrically insulated from the frame and having a tip extending within a groove in the roller without contacting the roller to provide electrical signals corresponding to the temperature of the roller, and a grounded detecting device receiving the electrical signals from the temperature sensor and having an alarm circuit therein providing alarm signals when the temperature of the roller is below or above low and high limits, respectively. If the temperature sensor contacts the roller, a current will be produced between the frame and the detecting device ground to develop a signal overlapping the electrical signals and representing a sufficient increase or decrease in temperature of the roller received by the alarm circuit to provide an alarm signal.

8 Claims, 10 Drawing Figures

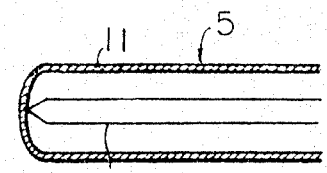
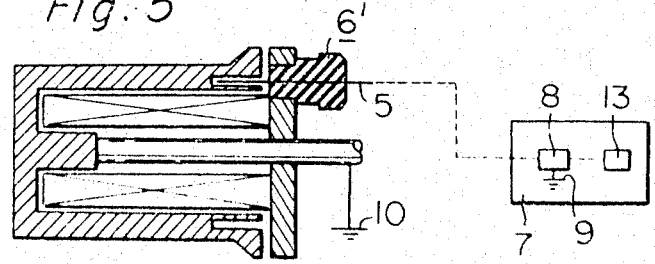
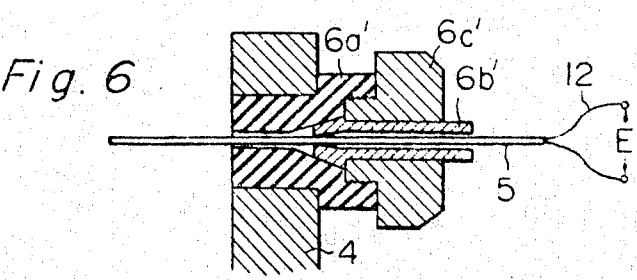
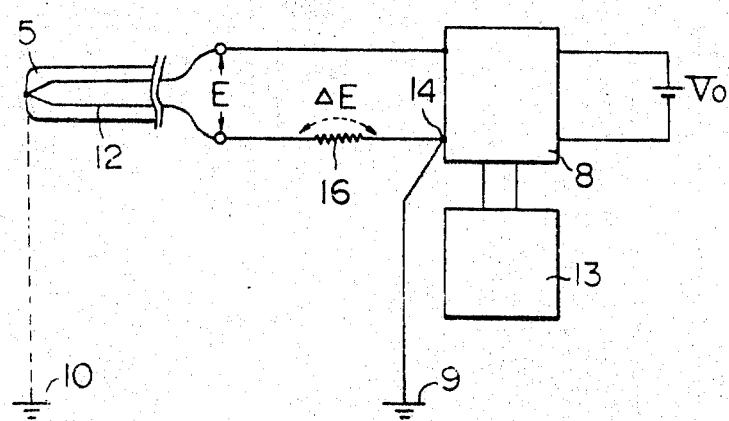

TEMPERATURE MEASURING APPARATUS FOR ROTATING ROLLERS

The present application is a continuation-in-part of pending Patent application, Ser. No. 135,223 filed Apr. 19, 1971, now abandoned.

BACKGROUND OF THE INVENTION

1. Field of the Invention

The present invention pertains to temperature measurement of rotating rollers utilized in textile treatment and, more particularly, to apparatus for measuring the temperature of such rollers providing an alarm upon contact of a temperature sensor with the rotating roller.

2. Discussion of the Prior Art

It is essential to precisely control the surface temperature of heated rotating rollers, such as those used for heat treatment of synthetic fibers while the rollers are rotating; and, to provide such control, it is necessary to accurately detect surface temperature of the rollers. In order to detect the surface temperature of a roller during rotation, the roller is normally provided with an annular groove, and a temperature sensor has a tip extending within the annular groove without contacting the side walls thereof, such as is shown in Japanese Patent Publication Nos. 14178/68 and 2497/69. The temperature sensor normally includes a sensing element, such as a thermocouple, connected to a metallic guard tube at one point such that the sensing element is maintained at the same electrical potential as the guard tube. When thermocouple sensing elements are utilized with the structure described above, they are normally referred to as "measuring junction grounded tip" devices. If such a temperature sensor is grounded during operation, such as by contact with the roller, the temperature sensing circuit becomes grounded at two points thereby adversely effecting the output thereof by altering the electrical signals produced corresponding to the temperatures sensed and providing inaccurate temperature measurements. Accordingly, detecting circuitry utilized with the temperature sensor must be insulated from the guard tube or the detecting circuitry must be insulated from ground.

Sensing elements, particularly thermocouples, insulated from a guard tube therefor are extremely expensive, and the insulation of the detecting circuitry from ground provides undesirable inconvenience and complexity of circuitry when a plurality of detecting circuits are utilized. That is, each source of electricity utilized for those applications incorporating a plurality of detecting circuits must be insulated from the other thereby requiring either a plurality of sources of electricity or a transformer or the like to maintain the insulation between the detecting circuits and ground.

Furthermore, where the temperature sensor is positioned in space without contacting the sides of an annular groove of a rotating roller, contact faults are produced by the temperature sensor coming into contact with the inner surface of the groove. In order that temperature measurement of a rotating roller may be accurately determined, it is essential that the width of the annular groove be as small as possible thereby increasing the frequency of contact faults. If a contact fault occurs, frictional heat acts on the temperature detector resulting in inaccurate temperature measurement of the surface temperature of the rotating roller particularly where the temperature measuring apparatus is utilized in a control device providing a feedback control of a heating element within a roller. That is, the increase in heat caused by friction will cause the current supplied to the heating element to be reduced thereby permitting the roller to be operated at improper surface temperatures. Furthermore, the temperature of the rotating roller is lowered, as described above, in response to the heat from friction and it is consequently impossible to determine the contact fault from the detected temperature alone. Similarly, the contact fault cannot be detected by temperature irregularity alarm circuits; and, thus, not only will the surface temperature of the rotating roller be improperly controlled, but the temperature detecting circuit is subject to damage.

SUMMARY OF THE INVENTION

Accordingly, it is an object of the present invention to provide temperature measuring apparatus for immediately detecting a contact fault between a rotating roller and a temperature sensor.

Another object of the present invention is to permit a single source of electricity to be utilized for a plurality of temperature detecting circuits without requiring insulation from ground.

A more specific object of the present invention is to immediately detect contact between the inner surface of a groove in a rotating roller and a temperature sensor having a tip extending within the groove by modifying the electrical signals normally produced by the temperature sensor when contact occurs to actuate an alarm circuit.

An additional object of the present invention is to utilize simple, uncomplicated structure to provide instant detection of a contact fault in temperature sensing apparatus for a rotating roller.

The present invention has a further object in that detecting circuitry in apparatus for measuring the temperature of a rotating roller need not be insulated from ground and temperature control devices for such apparatus can utilize a common DC source of electricity, thermoset mechanism, alarm set mechanism and the like resulting in simplification of structure and circuitry.

In general, the temperature measuring apparatus of the present invention includes a fitting for mounting a temperature sensor on a frame which supports a rotating roller, the fitting electrically insulating the temperature sensor from the frame. Detecting circuitry, which receives electrical signals from the temperature sensor corresponding to the surface temperature of the rotating roller, includes an alarm circuit for providing alarm signals in response to abnormal high or low temperatures, and the detecting circuitry is connected to ground such that contact of the temperature sensor with the roller completes a circuit through the frame and the detecting circuitry ground to produce a signal overlapping the normally produced electrical signals to modify the electrical signals to represent an abnormal temperature thereby causing the alarm circuit to produce an alarm signal instantly detecting the contact fault.

The present invention is generally characterized in apparatus for measuring the temperature of a rotating roller having a groove therein and being grounded including; a temperature sensor mounted on a frame rotatably supporting the roller and electrically insulated therefrom, the temperature sensor having a tip extending within the groove in the roller to provide electrical signals corresponding to the temperature of the roller; a grounded detector including an alarm circuit; and means connecting the temperature sensor with the detector to supply the electrical signals thereto, the connecting means being short circuited to the roller when the temperature sensor contacts the roller to modify the electrical signals, the alarm circuit being responsive to the modified electrical signals to provide an alarm signal when the temperature sensor contacts the roller whereby a contact fault between the temperature sensor and the roller is immediately detected.

Some of the advantages of the present invention over the prior art are that contact faults are immediately detected, the apparatus is inexpensive and simple in construction, and normally used alarm circuits can be utilized to indicate the contact faults.

Other objects and advantages of the present invention will become apparent from the following description of the preferred embodiments taken in conjunction with the accompanying drawings.

BRIEF DESCRIPTION OF THE DRAWINGS

FIG. 3 is a diagrammatic illustration of a thermocouple temperature sensor for use with the apparatus of FIG. 1 and the apparatus of the present invention.

FIG. 5 is a diagrammatic section of apparatus for measuring the temperature of a rotating roller according to the present invention.

FIG. 6 is a diagrammatic section of the fitting of the apparatus of FIG. 5 mounting the temperature sensor on the frame.

FIG. 7 is a diagrammatic illustration of apparatus for measuring the temperature of a rotating roller according to the present invention.

DESCRIPTION OF THE PREFERRED EMBODIMENTS

Figure 1:
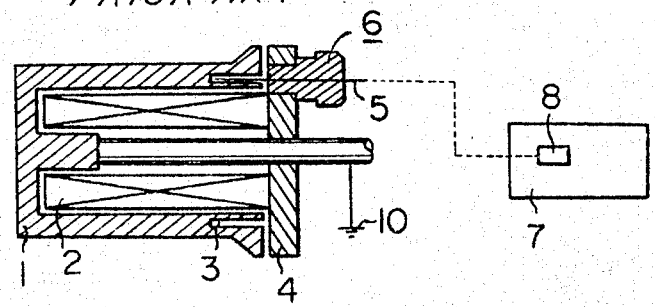
FIG. 1 is a diagrammatic section of conventional apparatus for measuring the temperature of a rotating roller.

Apparatus for measuring the temperature of a rotating roller in accordance with the prior art is illustrated in FIGS. 1 through 4 and will be described briefly hereinafter in order that the present invention may be more fully appreciated.

A roller 1 is mounted for rotation by means of a shaft on a suitable frame, the roller 1 being hollow to receive a heating element 2, such as a coil where induction heating techniques are utilized. The roller 1 is usually grounded via the shaft. Roller 1 has an annular groove 3 formed in the end surface thereof adjacent a flange 4 of the frame, and the heating element 2 is mounted on the flange 4 to extend within the hollow portion of the roller. A temperature sensor, generally indicated at 5, extends through the flange 4 and has a tip extending within the groove 3 in the roller. The temperature sensor 5 is mounted on the flange 4 with the use of an electrically conductive fitting generally indicated at 6, the fitting including a support 6a having a nose received in an aperture in flange 4 with a central bore therethrough opening into a conical chamber receiving a conical end of a packing member 6b having a central bore therethrough aligned with the central bore in support 6a. A press plug 6c has a central bore therein to receive packing member 6b and has an externally threaded portion screwed into an internally threaded recess in support 6a to press the conical end of packing member 6b into the conical chamber in the support 6a to firmly grip the temperature sensor 5.

Figure 4:
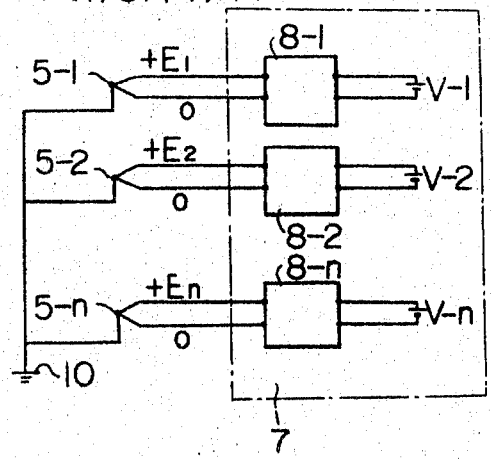
FIG. 4 is a diagrammatic illustration of conventional temperature measuring apparatus employing a plurality of temperature sensors and detecting circuits.

Conventionally, the fitting 6 is made of an electrically conductive metal material and, for this reason, as illustrated in FIG. 3, the temperature sensor 5 normally includes a tubular guard 11 surrounding a sensing element 12 such that the sensing element contacts the guard tube and is grounded through the guard tube and the fitting 6. In order to assure that the ground potential does not adversely affect temperature measurement, a temperature control device 7 is utilized including a temperature detecting circuit 8 which is insulated from ground as illustrated in FIG. 1. When, as illustrated in FIG. 4, the control device 7 is utilized for a plurality of rollers 1, a similar plurality of temperature detecting circuits 8-1, 8-2 ... 8-n are utilized, and each detecting circuit is operated with a DC source V-1, V-2, ... V-n, respectively, such DC sources being insulated from each other and from ground.

Apparatus for measuring the temperature of a rotating roller in accordance with the present invention utilizing the temperature sensor 5 of FIG. 3 is illustrated in FIGS. 5, 6 and 7. As illustrated in FIG. 5, the apparatus of the present invention may be utilized with a roller and frame support of construction similar to that described in FIG. 1; however, the temperature measuring apparatus of the present invention may be utilized with any suitable rotating roller as will be appreciated from the following.

Figure 2:
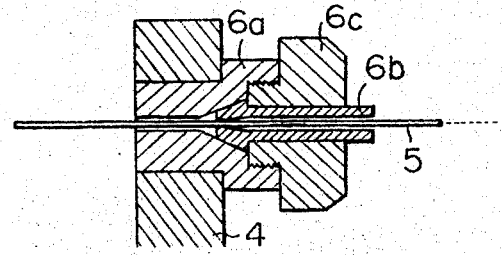
FIG. 2 is a diagrammatic section of the fitting of the apparatus of FIG. 1 mounting the temperature sensor on the frame.

The apparatus of the present invention includes a fitting 6', as best shown in FIGS. 5 and 6, mounted on the flange 4 carried by the frame so as to electrically insulate the temperature sensor 5 from the frame. The fitting 6' includes a support 6a' having a nose received in an aperture in the flange 4, a packing member 6b' having a conical end received in a conical chamber in support 6a' and a press plug 6c' screwed into support 6a' to clamp the packing member 6b' against the guard tube aa of the temperature sensor 5. The configurations of the components of fitting 6' are the same as those of fitting 6, as shown in FIG. 2, such that central bores extending through support 6a' and packing member 6b' communicate to permit the temperature sensor 5 to extend therethrough, and press plug 6c' has a central bore therein receiving packing member 6b' and forcing the conical end thereof into the conical chamber of support 6a' by engagement with a shoulder at the conical end. The fitting 6' is generally non-electrically conductive material, such as polytetrafluoroethylene, thereby insulating the guard tube 11 from the flange 4.

A temperature control device 7 includes detecting circuitry with a detecting circuit 8 receiving electrical signals from the sensor 5 corresponding to temperatures sensed at the roller and providing amplified signals to an alarm circuit 13 which compares sensed temperatures with high and low set points and to a feedback control network if desirable. During normal operation, only signals corresponding to sensed temperatures are supplied by temperature sensor 5 to detecting circuit 8. Thus, detecting circuit 8 can be referenced to ground 9, as illustrated in FIG. 5, while normal temperature sensing operation is effected with the sensor 5 not contacting the roller 1.

If, during operation, however, the temperature sensor 5 should come into contact with the inner surface of the groove 3 in the roller, the temperature sensor 5 will be short circuited to the roller; that is, the metal guard tube 11 around the sensing element 12 will be connected to frame ground 10 through the roller 1 and the shaft. As a result, the network including temperature sensor 5 and detecting circuit 8 is grounded at two points, i.e. the frame ground point 10 and the detector ground point 9. With the sensor grounded, a small amount of current flows in the electrical circuit between the tip of the sensor 5, frame ground 10, detector ground 9 and the grounded lead of the sensing element 12, the current being caused by the noise between the grounds or voltage thereat or the like and subject to fluctuation. In accordance with the present invention, detection of the fluctuation in the small current by an alarm circuit provides instant recognition of a contact fault in the temperature measuring apparatus.

The temperature sensing apparatus of the present invention will be described in more detail with respect to FIG. 7 wherein the alarm circuit 13 is utilized to provide the alarm function in that, during normal operation when the temperature sensor 5 is not in contact with the inner surface of the groove 3 in the roller, the tip of the temperature sensing element 12, which is desirably a thermocouple, is insulated from the roller 1 and, accordingly, does not see frame ground 10. Accordingly, a signal E taken across the leads of the sensing element 12 corresponds to the temperature sensed in the groove generated by the sensing element 12 and is supplied to detecting circuit 8. When, however, the tip of the sensing element 12 is grounded through the roller and the shaft at ground 10, as illustrated by the dashed line in FIG. 7, by contact of the temperature sensor 5 with the inner surface of the groove of the roller, a closed loop is formed from the tip of sensing element 12 through frame ground 10, detector ground 9, an input terminal 14 to detecting circuit 8 and back to the tip of the sensing element 12 through a reference lead wire of the sensing element having a resistance 16. Thus, a current will flow in the loop due to noise effected by the ground voltage, which may be from several volts to several tens of volts, generated between the frame ground 10 and the detector ground 9. The loop current develops a continuously fluctuating small voltage $\Delta E$, which may be between several hundred microvolts and several millivolts, across resistance 16 in the lead wire from sensing element 12 connected with input 14 of detecting circuit 8. The small voltage $\Delta E$ is supplied to detecting circuit 8 in overlapping relation to the signal E produced by the temperature sensing element, such as the voltage $\Delta E$ relative to the electromotive force produced by a thermocouple. The signal $\Delta E$ represents temperature variations from several degrees to several tens of degrees and the combination of signals E and $\Delta E$ exceeds the high set point of the alarm circuit 13 such that the circuit 13 provides an alarm signal.

Figure 8:
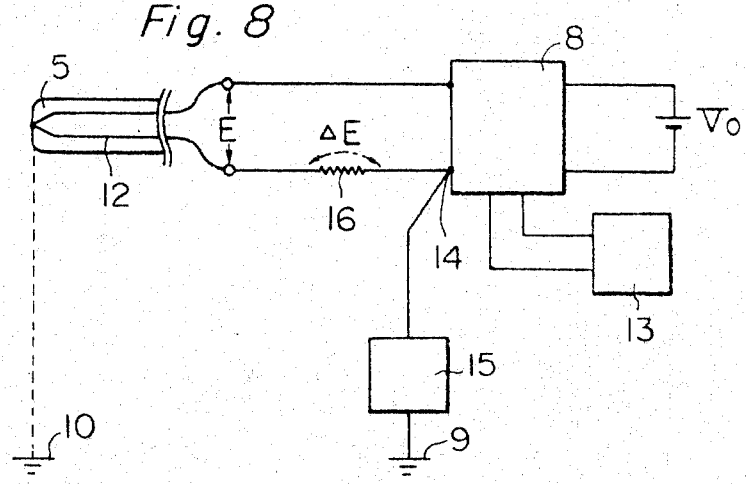
FIG. 8 is a diagrammatic illustration of another embodiment of apparatus for measuring the temperature of a rotating roller according to the present invention.

Another embodiment of temperature sensing apparatus according to the present invention is illustrated in FIG. 8, the embodiment of FIG. 8 differing from the embodiment of FIG. 7 substantially only in the addition of a voltage generator 15 in series between detector ground 9 and input 14 to detecting circuit 8 in order to assure that a sufficient fluctuating signal $\Delta E$ is generated across resistance 16 even if the noise voltage generated between frame ground 10 and detector ground 9 is negligible due to these two grounds 9 and 10 being substantially short circuited since, in this case, the voltage $\Delta E$ would not correspond to sufficient temperature degrees to actuate the alarm circuit 13.

Voltage generator 15 generates a small voltage oscillating or fluctuating at approximately 1Hz between detector ground 9 and input 14 such that the voltage generator is included within the closed loop caused by contact of the temperature sensor 5 with the inner surface of the groove in the roller; and, when the loop is closed, the generator 15 causes a small fluctuating current to flow in the loop such that a voltage $\Delta E$ is developed across resistance 16 of sufficient magnitude to actuate the alarm circuit 13. Voltage generator 15 is isolated from source $V_o$ and does not affect operation of the detecting circuitry unless there is contact between temperature sensor 5 and the roller to close the ground circuit for the voltage generator.

Figure 9:
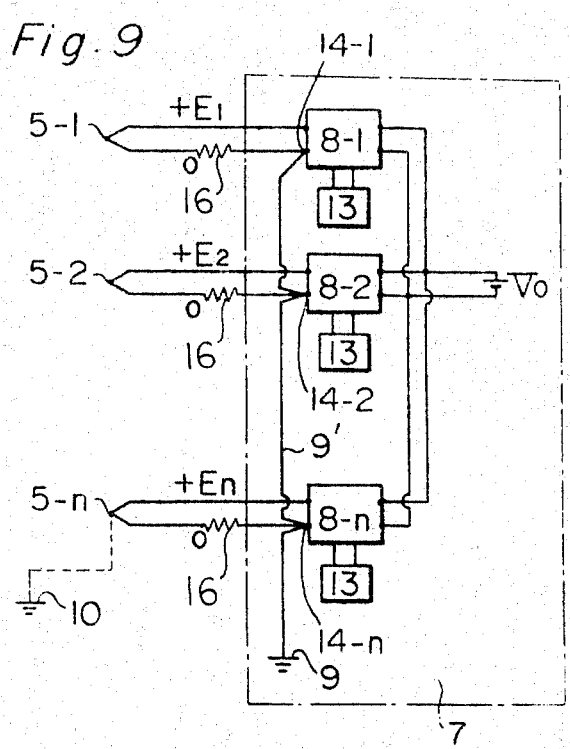
FIG. 9 is a diagrammatic illustration of apparatus for measuring the temperature of a plurality of rotating rollers according to the present invention.

Apparatus for measuring temperatures in accordance with the present invention is illustrated in FIG. 9 for use with a plurality of n rollers. Detecting circuits 8-1, 8-2, ... 8-n and alarm circuit 13 connected thereto are each connected with one of the temperature sensors 5-1, 5-2, ... 5-n, for the plurality of rollers, respectively. A lead wire 9' connects each of the inputs 14-1, 14-2, ... 14-n, of the detecting circuits with detector ground 9, and a single voltage source $V_o$ supplies operating potential to the detector and alarm circuits since the temperature sensors 5 are mounted to flanges of the roller and electrically insulated therefrom by fitting support 6a'.

In operation, if the temperature sensor 5-n comes into contact with the inner surface of the groove in roller n, as shown in dashed lines, the signal $E_n$ generated by the temperature sensor 5-n will overlap with a fluctuating signal $\Delta E$ developed by the resistance 16 in the reference lead wire of temperature sensor 5-n connected to the input 14-n of detecting circuit 8-n. Thus, only the alarm circuit 13 associated with the temperature sensor 5 that comes in contact with the roller being sensed will actuate an alarm, and the remaining rollers and temperature sensing apparatus continue to operate normally.

Thus, as described above, the apparatus for sensing temperatures of a roller in accordance with the present invention permits the immediate detection of a contact fault of a temperature sensor with the inner surface of an annular groove in the roller; and there is no need to insulate the detecting circuits 8 of the temperature control devices from ground thereby permitting the use of a single DC source $V_o$ for a plurality of temperature detecting circuits as well as single thermoset mechanisms, alarm set mechanisms and the like resulting in reduced components and simplification of the circuitry and structure required for temperature sensing apparatus for a plurality of rollers.

Figure 10:
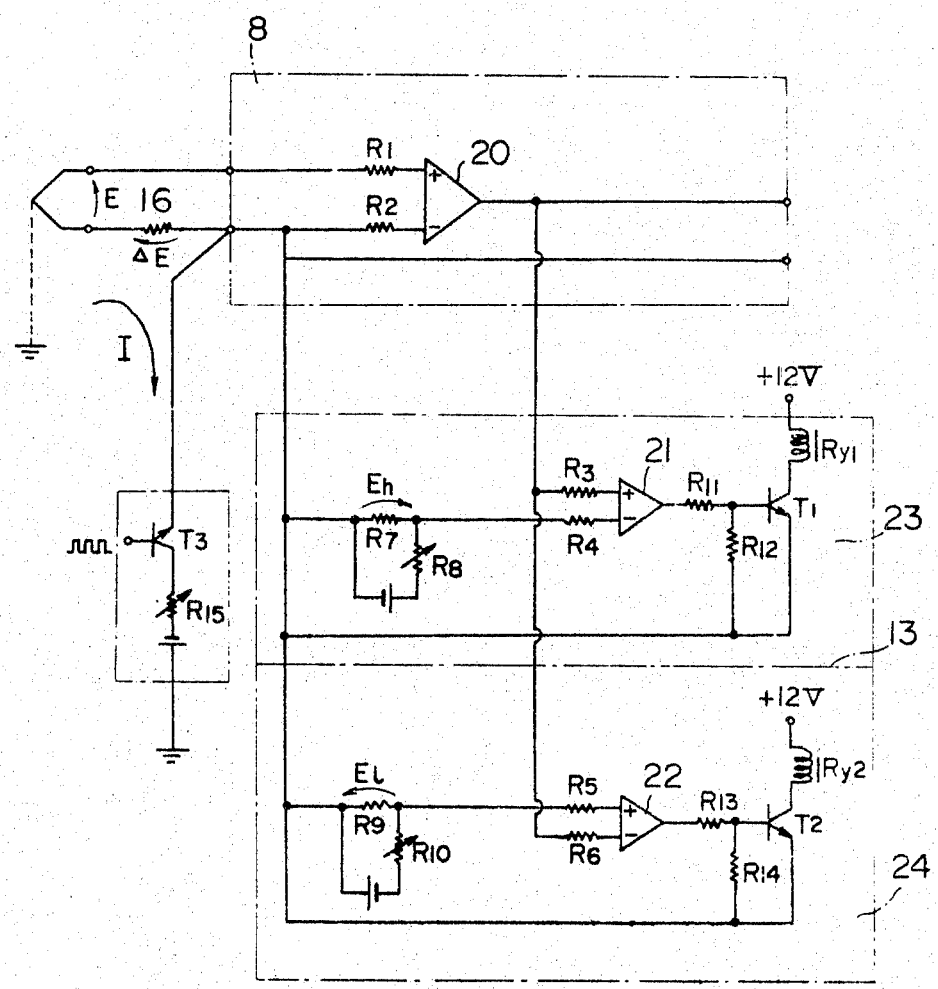
FIG. 10 is a schematic diagram of circuitry for use with the temperature measuring operation of the present invention.

One example of detecting circuitry for use with the present invention is illustrated in FIG. 10. Detecting circuit 8 includes an amplifier 20 receiving inputs through resistors R1 and R2 corresponding to the voltage E developed across the temperature sensing element 12 and any voltage ΔE developed across resistance 16. Alarm circuit 13 includes an upper limit alarm circuit 23 and a lower limit alarm circuit 24. Upper limit alarm circuit 23 includes a reference setting network connected to input 14 of detecting circuit 8 and having resistors R7 and R8 connected with a DC source and coupled to an input of a differential amplifier 21 through a resistor R4, amplifier 21 comparing a high limit reference signal Eh received from the reference setting network with a temperature signal received through resistor R3 from the output of amplifier 20. The output of amplifier 21 operates a transistor T1 through resistors R11 and R12 to control an upper limit alarm relay Ry1. Lower limit alarm circuit 24 includes a reference setting network connected to input 14 of detecting circuit 8 and having resistors R9 and R10 connected with a DC source and coupled to an input of a differential amplifier 22 through a resistor R5, amplifier 22 comparing a low limit reference signal El received from the reference setting network with the temperature signal received through resistor R6 from the output of amplifier 20. The output of amplifier 22 operates a transistor T2 through resistors R13 and R14 to control a lower limit alarm relay Ry2. Voltage generator 15 includes a transistor T3 having its collector connected through a variable resistor R15 and a DC source to ground, the emitter of transistor T3 being connected to input 14 of detecting circuit 8 and the base of transistor T3 receiving a control pulse waveform from any suitable source at approximately 1 Hz.

In operation, variable resistors R8 and R10 are adjusted to set high and low temperature alarm levels, respectively; and, if the temperature of roller 1 as sensed by element 12 is above or below the alarm levels, either transistor T1 or transistor T2 will be rendered conductive to energize alarm relays Ry1 or Ry2, respectively, and provide an alarm signal of any suitable nature, such as an audible and/or visible alarm coupled with stopping rotation of the roller. If the temperature sensed by element 12 is within the range between the high and low alarm limits, the output from aplifier 20 is used to feed any suitable display and/or control device, such as a feedback network for controlling current supplied to the heating element 2 in accordance with the temperature of the roller.

If the guard tube 11 of the temperature sensor 5 should contact the roller 1, a small current will be induced in the circuit loop between frame ground 10, detector ground 9, voltage generator 15 and resistance 16 to develop a voltage ΔE across resistance 16 which, as described above, represents a predetermined number of degrees of temperature thereby energizing the alarm relay Ry1.

The circuitry illustrated in FIG. 10 is of an illustrative nature, and it will be appreciated that the present invention can utilize any suitable detecting circuitry as long as such circuitry is adjusted to respond to the voltage ΔE developed when the temperature sensor 5 contacts the inner surface of the groove 3 of the roller.

While a thermocouple has been described as utilized in the temperature sensor 5, any suitable temperature sensing means may be utilized therewith to provide electrical signals corresponding to the temperature of the roller, such as thermistors, temperature sensitive semiconductor devices and the like. Of primary importance in utilizing the present invention is the capability of utilizing one of the inputs from the temperature sensor to the detecting circuitry as a reference point, such as the input 14 in FIGS. 7, 8, 9 and 10, whereby the contact fault loop is completed when the temperature sensor contacts the roller.

Inasmuch as the present invention is subject to many variations, modifications and changes in detail, it is intended that all matter described above or disclosed in the accompanying drawings be interpreted as illustrative and not in a limiting sense.

What is claimed is:

1. Apparatus for measuring the temperature of a rotating roller having a groove therein and being grounded comprising temperature sensing means mounted on a frame rotatably supporting the roller and electrically insulated therefrom, said temperature sensing means having a tip extending within the groove in the roller without contacting the roller and providing electrical signals corresponding to the temperature of the roller;

detecting means connected to ground and including an alarm circuit; and means connecting said temperature sensing means with said detecting means to supply said electrical signals thereto, said connecting means being short circuited to the roller when said temperature sensing means contacts the roller to modify said electrical signals, said alarm circuit being responsive to said modified electrical signals to provide an alarm signal when said temperature sensing means contacts the roller whereby a contact fault between said temperature sensing means and the roller is immediately detected.

2. The apparatus as recited in claim 1 wherein said temperature sensing means includes a thermocouple contacting and disposed within an electrically conductive guard tube.

3. The apparatus as recited in claim 1 wherein said connecting means includes a voltage generator substantially short circuited to the roller, connected to said detecting means and operative to supply a voltage to modify said electrical signals when said temperature sensing means contacts the roller, so that said detecting means is grounded via said voltage generator.

4. The apparatus as recited in claim 1 wherein said detecting means includes an amplifier having first and second inputs, said temperature sensing means has first and second leads, and said connecting means connects said first and second leads to said first and second inputs, respectively, said second input being grounded and said second lead being short circuited to the roller when said temperature sensing means contacts the roller to develop a modifying signal across said second lead by current therethrough, said modifying signal overlapping said electrical signals.

5. The apparatus as recited in claim 4 wherein said connecting means includes a voltage generator substantially short circuited to the roller and connected to said second input so that said second input is grounded via said voltage generator, said voltage generator providing a fluctuating voltage when said temperature sensing means contacts said roller.

6. The apparatus as recited in claim 5 wherein said temperature sensing means includes a thermocouple connected to said first and second leads and connected to an electrically conductive guard tube surrounding said thermocouple.

7. The apparatus as recited in claim 1 and further comprising a plurality of temperature sensing means for providing electrical signals corresponding to the temperatures of a plurality of rollers, respectively, a plurality of detecting means each including an alarm circuit and connected to ground, and a plurality of means connecting said temperature sensing means with said detecting means to supply said electrical signals thereto, respectively, each of said connecting means being short circuited to the roller when its corresponding temperature sensing means contacts a roller to modify said electrical signals, each of said alarm circuits being reponsive to said modified electrical signals to provide an alarm signal when a corresponding one of said temperature sensing means contacts a roller.

8. The apparatus as recited in claim 7 wherein said temperature sensing means is mounted on said frame by a non-electrically conductive fitting.

* * * * *